United States Patent
Cho et al.

(10) Patent No.: US 8,363,185 B2
(45) Date of Patent: Jan. 29, 2013

(54) PHOTONIC CRYSTAL OPTICAL FILTER, TRANSMISSIVE COLOR FILTER, TRANSFLECTIVE COLOR FILTER, AND DISPLAY APPARATUS USING THE COLOR FILTERS

(75) Inventors: Eun-hyoung Cho, Seoul (KR); Jin-seung Sohn, Seoul (KR); Seock-hwan Kang, Suwon-si (KR); Hae-sung Kim, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 291 days.

(21) Appl. No.: 12/461,530

(22) Filed: Aug. 14, 2009

(65) Prior Publication Data

US 2010/0091225 A1    Apr. 15, 2010

(30) Foreign Application Priority Data

Oct. 10, 2008  (KR) .................. 10-2008-0099776
Feb. 12, 2009  (KR) .................. 10-2009-0011501

(51) Int. Cl.
*G02F 1/1335* (2006.01)

(52) U.S. Cl. .................................. 349/105; 349/118

(58) Field of Classification Search ............ 349/105, 349/118
See application file for complete search history.

(56) References Cited

U.S. PATENT DOCUMENTS

| | | | | |
|---|---|---|---|---|
| 5,998,298 A | * | 12/1999 | Fleming et al. | 438/692 |
| 6,064,511 A | * | 5/2000 | Fortmann et al. | 359/321 |
| 6,631,236 B2 | * | 10/2003 | Yamada | 385/129 |
| 7,194,174 B2 | * | 3/2007 | Dridi et al. | 385/129 |
| 7,421,179 B1 | * | 9/2008 | Jiang et al. | 385/129 |
| 7,447,404 B2 | * | 11/2008 | Miller | 385/43 |
| 2001/0026668 A1 | * | 10/2001 | Yamada | 385/125 |
| 2004/0264903 A1 | * | 12/2004 | Dridi et al. | 385/129 |
| 2005/0238310 A1 | * | 10/2005 | Hoshi et al. | 385/129 |
| 2006/0147617 A1 | | 7/2006 | Chen et al. | |
| 2006/0159411 A1 | * | 7/2006 | Miller | 385/129 |
| 2009/0116029 A1 | * | 5/2009 | Ohtera et al. | 356/456 |
| 2010/0014821 A1 | * | 1/2010 | Tokushima | 385/129 |

FOREIGN PATENT DOCUMENTS

| | | |
|---|---|---|
| JP | 2007-041555 | 2/2007 |
| KR | 10-2004-0100002 | 12/2004 |
| KR | 10-0654842 | 11/2006 |

* cited by examiner

*Primary Examiner* — K. Cyrus Kianni

(74) *Attorney, Agent, or Firm* — Harness, Dickey & Pierce, P.L.C.

(57) ABSTRACT

Example embodiments relate to a photonic crystal optical filter, a transmissive color filter, a transflective color filter, and a display apparatus using the photonic crystal optical filter. The transmissive color filter may include a transparent substrate; a barrier layer formed on the transparent substrate and having a plurality of pixel areas; and a plurality of photonic crystal units formed on the plurality of pixel areas. Each of the plurality of photonic crystal units may have a structure such that a first material having a relatively high refractive index and a second material having a relatively low refractive index are periodically arranged so as to transmit light having a wavelength band corresponding to a photonic band gap. An optical cut-off layer may be formed on the first material.

8 Claims, 9 Drawing Sheets

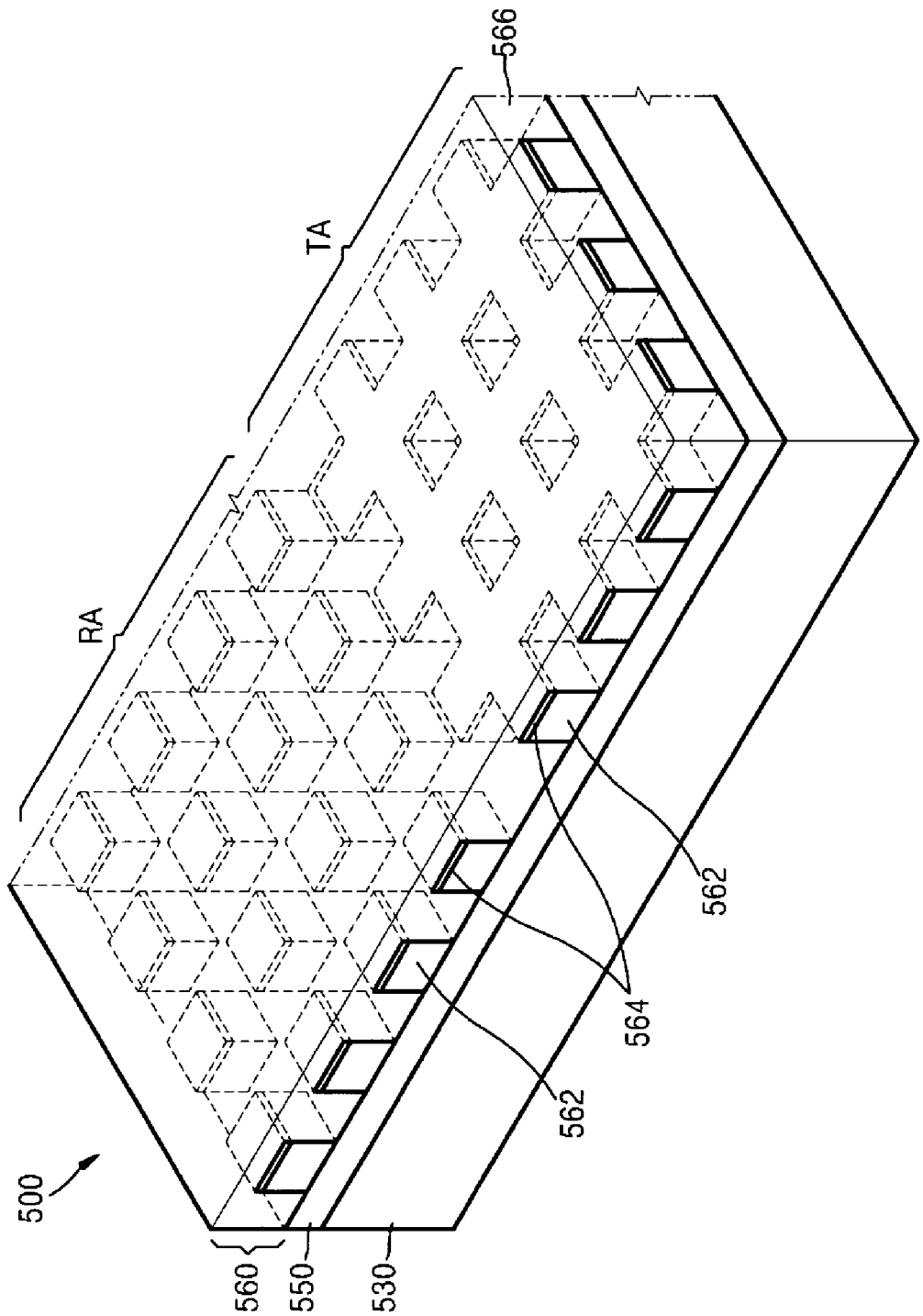

PHOTONIC CRYSTAL OPTICAL FILTER, TRANSMISSIVE COLOR FILTER, TRANSFLECTIVE COLOR FILTER, AND DISPLAY APPARATUS USING THE COLOR FILTERS

CROSS-REFERENCE TO RELATED APPLICATIONS

This application claims priority under 35 U.S.C. §119 to Korean Patent Application No. 10-2008-0099776, filed on Oct. 10, 2008 with the Korean Intellectual Property Office, and Korean Patent Application No 10-2009-0011501, filed on Feb. 12, 2009 with the Korean Intellectual Property Office, the disclosures of which are incorporated herein in their entirety by reference.

BACKGROUND

1. Field

Example embodiments relate to optical filters, color filters using optical filters, and display apparatuses using color filters.

2. Description of the Related Art

Color filters are conventionally manufactured using a pigment dispersion method in which a solution containing a dispersed pigment is coated on a photoresist and the photoresist is patterned. Because the pigment dispersion method uses a photolithography method, a relatively large-sized screen may be realized not only with thermal and chemical stabilities but also with color uniformity. However, because the color characteristics of such pigment-type color filters are determined by unique absorption spectrums of the dispersed pigment and the light transmissivity is decreased as the thickness of the pigment-type color filters is increased, luminance is decreased in regard to higher color purity color filters.

There has been recent interest in photonic crystal color filters based on structural colors. The photonic crystal color filters use nanostructures which are smaller than the wavelengths of light to control the reflection or absorption of light incident from the outside, to thereby reflect (or transmit) light of desired colors and transmit (or reflect) light of undesired colors. The photonic crystal color filters have a structure in which nano-sized unit blocks are periodically arranged at predetermined intervals. The optical characteristics of the photonic crystal color filters are determined by the size and periods of the nanostructures, and thus the photonic crystal color filters having improved wavelength selectivity and a color bandwidth that may be adjusted with relative ease may be manufactured by manufacturing predetermined nanostructures that are appropriate for a predetermined wavelength.

SUMMARY

Example embodiments relate to a photonic crystal optical filter, a transmissive color filter, a transflective color filter, and a display apparatus realizing higher color purity by using the photonic crystal optical filter.

A photonic crystal optical filter according to example embodiments may include a transparent substrate; a barrier layer on the transparent substrate; and a photonic crystal layer on the barrier layer, the photonic crystal layer having a first material periodically arranged within a second material and an optical cut-off layer on the first material, a refractive index of the first material being higher than a refractive index of the second material, the photonic crystal layer configured to transmit light having a wavelength corresponding to a photonic band gap.

The first material may be formed into a lattice pattern in which holes are formed. A difference between the real parts of the refractive indices of the first material and the second material may be about two or greater, and the imaginary parts of the refractive indices of the first material and the second material may be about 0.1 or smaller in a visible light wavelength band. The first material may be formed into a lattice pattern in which holes are formed, and the second material may be formed as a supporting layer that supports the lattice pattern. The barrier layer may be formed of a material that is identical to the second material.

A transmissive color filter according to example embodiments may include a transparent substrate; a barrier layer on the transparent substrate and having a plurality of pixel areas; and a plurality of photonic crystal units on the plurality of pixel areas, each photonic crystal unit having a first material periodically arranged within a second material and an optical cut-off layer on the first material, a refractive index of the first material being higher than a refractive index of the second material, the photonic crystal unit configured to transmit light having a wavelength band corresponding to a photonic band gap.

The plurality of photonic crystal units may include a plurality of red photonic crystal units transmitting red color light; a plurality of green photonic crystal units transmitting green color light; and a plurality of blue photonic crystal units transmitting blue color light. The plurality of red photonic crystal units, green photonic crystal units, and blue photonic crystal units may be arranged in striped patterns, mosaic patterns, or delta patterns.

The first material may be formed into a lattice pattern in which holes are formed. A difference between real parts of the refractive indices of the first material and the second material may be about two or greater, and the imaginary parts of the refractive indices of the first material and the second material may be about 0.1 or smaller in a visible light wavelength band. The first material may be formed into a lattice pattern in which holes are formed, and the second material may be formed as a supporting layer that fills the holes to support the lattice pattern. The barrier layer may be formed of a material that is the same as the second material.

A transflective color filter according to example embodiments may include a transparent substrate; a barrier layer on the transparent substrate and having a plurality of pixel areas; and a plurality of photonic crystal units on the plurality of pixel areas, each photonic crystal unit having a first material periodically arranged within a second material, a refractive index of the first material being higher than a refractive index of the second material, and each of the photonic crystal units having a reflection area in which the first material is formed into a plurality of island-shaped patterns and a transmission area in which the first material is formed into a lattice pattern having holes therein. An optical cut-off layer may be formed on the first material. The second material may be formed as a supporting layer that supports the island-shaped patterns and the lattice pattern.

A display apparatus according to example embodiments may include a liquid crystal layer of which transmissivity with respect to incident light is electrically controlled; the above-described transmissive color filter according to example embodiments; and a thin film transistor (TFT)-array layer having a plurality of TFTs that drive the liquid crystal layer according to image information. The plurality of the TFTs may be formed in each pixel area adjacent to the plurality of photonic crystal units, wherein the plurality of the TFTs and the plurality of the photonic crystal units may be formed on the transparent substrate.

A transflective display apparatus according to example embodiments may include a liquid crystal layer of which transmissivity with respect to incident light is electrically controlled; the above-described transflective color filter according to example embodiments; and a thin film transistor (TFT)-array layer having a plurality of TFTs that drive the liquid crystal layer according to image information. The plurality of the TFTs may be formed in each pixel area adjacent to the plurality of photonic crystal units, wherein the plurality of the TFTs and the plurality of the photonic crystal units may be formed on the transparent substrate.

BRIEF DESCRIPTION OF THE DRAWINGS

The above and/or other aspects of example embodiments may become more apparent and readily appreciated when the following description is taken in conjunction with the accompanying drawings of which:

FIG. 7 is a perspective view of a transflective color filter according to example embodiments.

DETAILED DESCRIPTION

Figure 1:
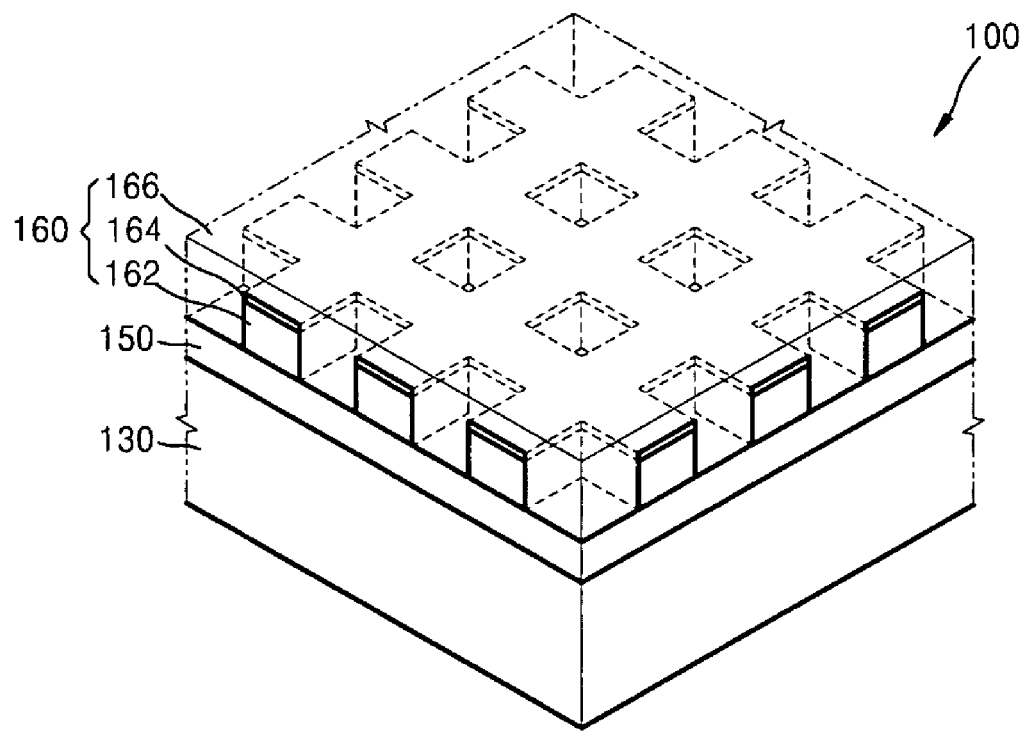
FIG. 1 is a perspective view of a photonic crystal optical filter according to example embodiments.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
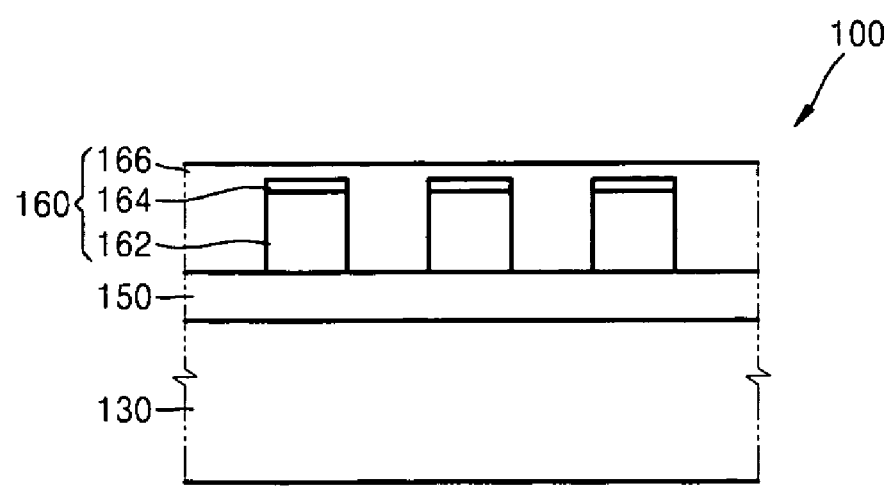
FIG. 2 is a cross-sectional view of the photonic crystal optical filter of FIG. 1.

FIG. 1 is a perspective view of a photonic crystal optical filter 100 according to example embodiments. FIG. 2 is a cross-sectional view of the photonic crystal optical filter 100 of FIG. 1. Referring to FIGS. 1 and 2, the photonic crystal optical filter 100 may include a transparent substrate 130, a barrier layer 150 formed on the transparent substrate 130, and a photonic crystal layer 160 formed on the barrier layer 150.

The photonic crystal layer 160 may be formed to transmit light having a wavelength band corresponding to a photonic band gap according to a periodical distribution of refractive indices of the photonic crystal layer 160. The photonic crystal layer 160 may have a structure in which a first material 162 having a relatively high refractive index and a second material 166 having a relatively low refractive index are periodically arranged, and an optical cut-off layer 164 is formed on the first material 162.

The first material 162 may be formed into a lattice pattern in which holes are formed. Although rectangular parallelepiped holes are shown as being formed in FIG. 1, it should be understood that circular, oval, or polygonal-shaped holes or holes having other shapes may also be formed. For instance, besides the cubic arrangement of the holes illustrated in FIG. 1, a hexagonal arrangement is also possible. The first material 162 has a larger refractive index than the second material 166. For example, a difference between the real parts of the refractive indices of the first material 162 and the second material 166 may be about 2 or greater. In addition, a difference between the imaginary parts of the refractive indices of the first material 162 and the second material 166 may be about 0.1 or smaller in wavelength bands of visible light. When the imaginary part of the refractive index is relatively large, reflectivity is reduced, and thus a material having a refractive index with a smaller imaginary part is used. The first material 162 may be one selected from the group consisting of monocrystal silicon, poly silicon (poly Si), AlSb, AlAs, AlGaAs, AlGaInP, BP, $ZnGeP_2$, and mixtures thereof. The second material 166 may be one selected from the group consisting of Air, poly carbonate (PC), poly styrene (PS), poly methyl methacrylate (PMMA), $Si_3N_4$, $SiO_2$, and mixtures thereof.

The second material 166 may be formed as a supporting layer that supports the first material 162 which is formed into a lattice pattern in which holes are formed. As illustrated in FIGS. 1 and 2, the second material 166 may be formed to cover spaces between the pattern of the first material 162 and upper portions of the first material 162. For example, when the pattern of the first material 162 is formed using amorphous silicon and crystallized to mono-crystal silicon or poly Si, the above-described structure may be selected to protect the pattern of the first material 162.

The optical cut-off layer 164 may improve the cut-off characteristics of the photonic crystal optical filter 100. The optical cut-off layer 164 may be formed as a silicon oxide layer ($SiO_2$) or a silicon nitride layer ($Si_3N_4$). The barrier layer 150 may be formed between the transparent substrate 130 and the photonic crystal layer 160, and has the function of reducing or preventing the decrease in crystalline purity of silicon. For instance, impurities inside a glass substrate used as the transparent substrate 130 may migrate into a silicon material used as the first material 162 of the photonic crystal layer 160 during a crystallization process. The barrier layer 150 may be formed of a material having a similar refractive index to the refractive index of the transparent substrate 130. The barrier layer 150 may be formed of a material that is the same as the material that is selected as the second material 166 forming the supporting layer.

The photonic crystal optical filter 100 having the above-described structure may transmit light having a predetermined wavelength band using the photonic crystalline structure having a periodical distribution of refractive indices. Because band range and width of the wavelength band are determined by the shape and periods of the pattern of the first material 162, the wavelength bands of light may be selected with relative ease, and also, the photonic crystal optical filter 100 has an improved filtering performance and thus may be used in various technical fields. For example, the photonic crystal optical filter 100 may be applied to solar cells, quantum dot light emitting diodes (QD-LED), organic light-emitting diodes (OLED), etc. Also, as will be described below, the optical filter 100 may be applied as a color filter of a display apparatus.

Figure 3:
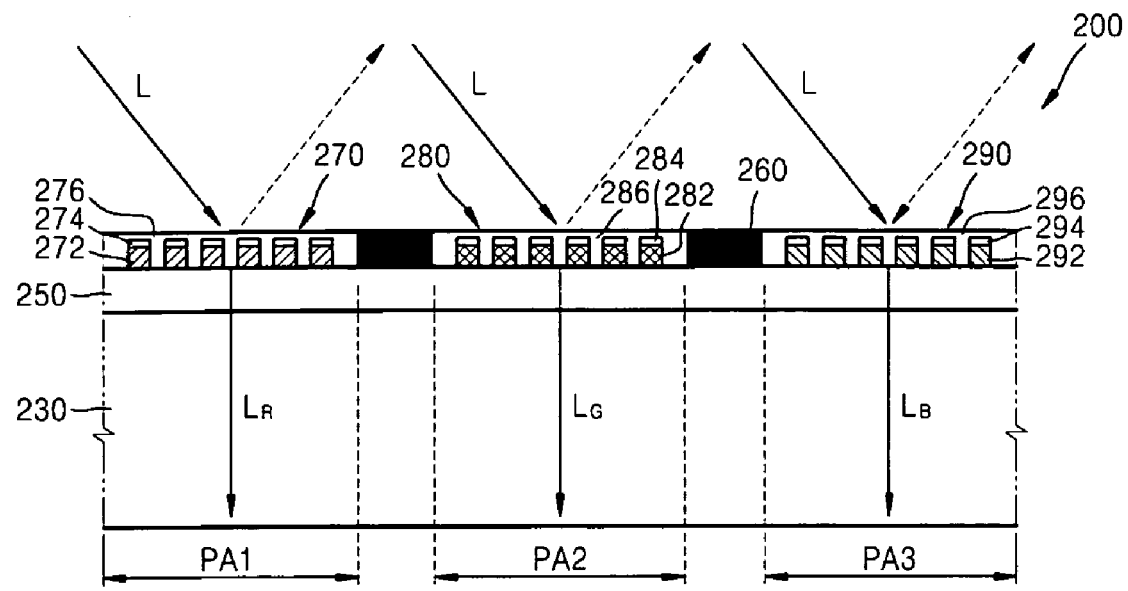
FIG. 3 is a cross-sectional view of a transmissive color filter according to example embodiments.

FIG. 3 is a cross-sectional view of a transmissive color filter 200 according to example embodiments. Referring to FIG. 3, the transmissive color filter 200 may include a transparent substrate 230, a barrier layer 250 formed on the transparent substrate 230, and photonic crystal units 270, 280, and 290 formed on the barrier layer 250 and transmitting light having a predetermined wavelength band.

A plurality of pixel areas PA1, PA2, and PA3 may be formed on the barrier layer 250. For example, the photonic crystal unit 270 transmitting red color light $L_R$ among incident light L and reflecting the other light may be formed in the pixel area PA1. The photonic crystal unit 280 transmitting green light $L_G$ among incident light L and reflecting the other light may be formed in the pixel area PA2. The photonic crystal unit 290 transmitting blue light $L_B$ among incident light L and reflecting the other light may be formed in the pixel area PA3. First materials 272, 282, and 292 having a relatively high refractive index and second materials 276, 286, and 296 having a relatively low refractive index are respectively and periodically formed in the photonic crystal unit 270, the photonic crystal unit 280, and the photonic crystal unit 290, and optical cut-off layers 274, 284, and 294 may be formed on the first materials 272, 282, and 292, respectively. For example, the first materials 272, 282, and 292 may be formed into lattice patterns in which holes are formed, as illustrated by the pattern of the first material 162 of FIG. 1. Black matrixes 260 may be formed between the photonic crystal unit 270, the photonic crystal unit 280, and the photonic crystal unit 290, respectively.

The materials of the first materials 272, 282, and 292, the second materials 276, 286, and 296, and the optical cut-off layers 274, 284, and 294 in the red photonic crystal unit 270, the green photonic crystal unit 280, and the blue photonic crystal unit 290 may be selected from the various materials used to form the first material 162, the second material 166, and the optical cut-off layer 164 of the photonic crystal optical filter 100. Also, the materials of the first materials 272, 282, and 292, the second materials 276, 286, and 296, and the optical cut-off layers 274, 284, and 294 may be identical or different, and the patterns and periods of the first materials 272, 282, and 292 may be selected differently such that each of red photonic crystal unit 270, green photonic crystal unit 280 and blue photonic crystal unit has photonic band gaps corresponding to red, green, and blue colors, respectively.

Because the red photonic crystal unit 270, the green photonic crystal unit 280, and the blue photonic crystal unit 290 respectively transmit red light ($L_R$), green light ($L_G$), and blue light ($L_B$) and reflect the other light, the color purity of the transmissive color filter 200 may be increased. In FIG. 3, the photonic crystal units 270, 280, and 290 forming a basic pixel are illustrated. However, it should be understood that the transmissive color filter 200 may have a structure in which the photonic crystal units 270, 280, and 290 are repeatedly arranged.

Figure 4A:
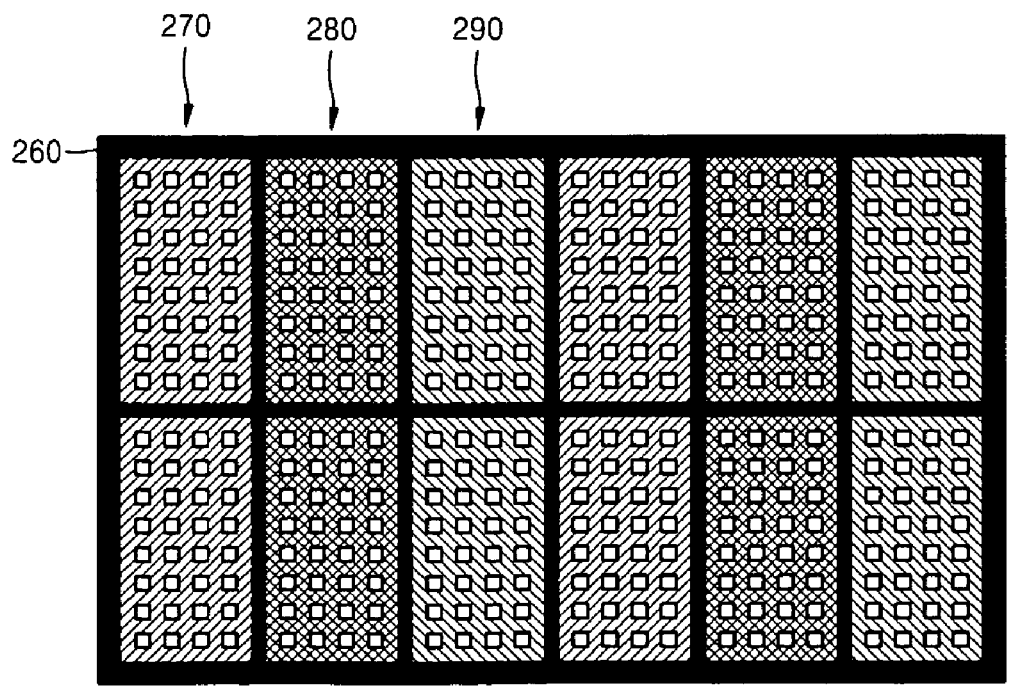
FIGS. 4A through 4C are plan views of the plurality of photonic crystal units of the transmissive color filter of FIG. 3.
Figure 4B:
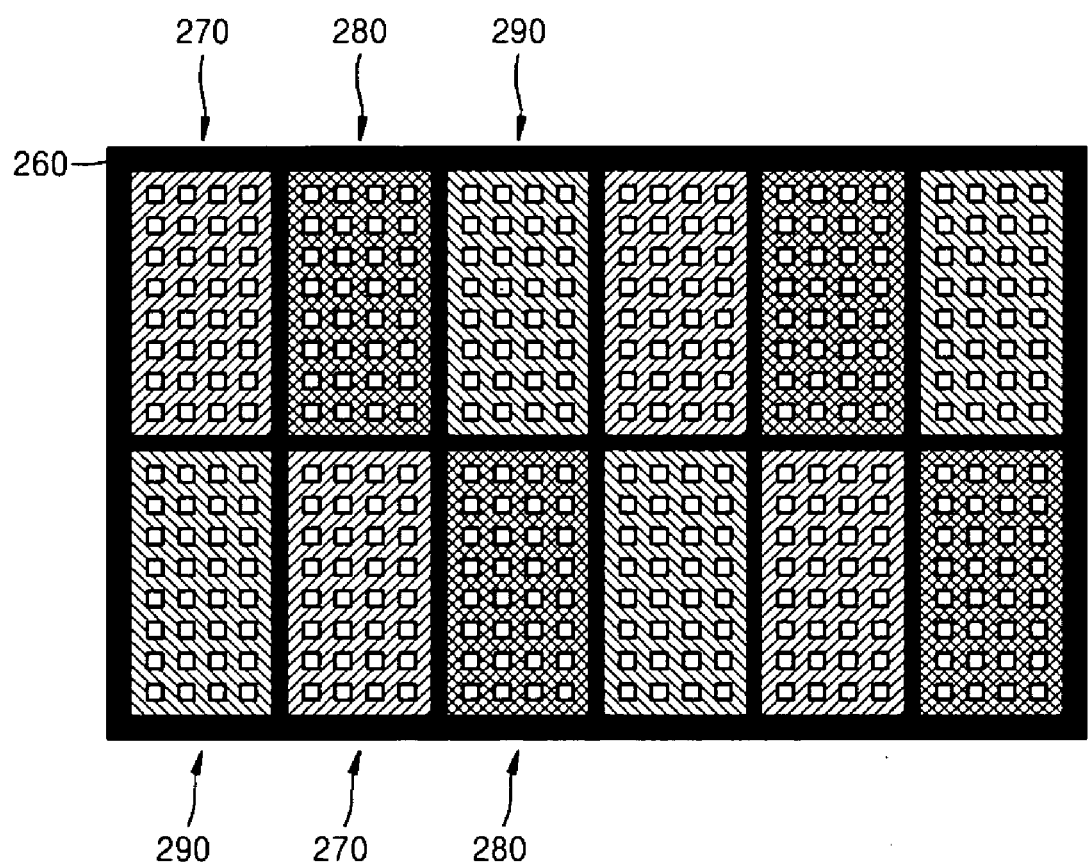
Figure 4C:
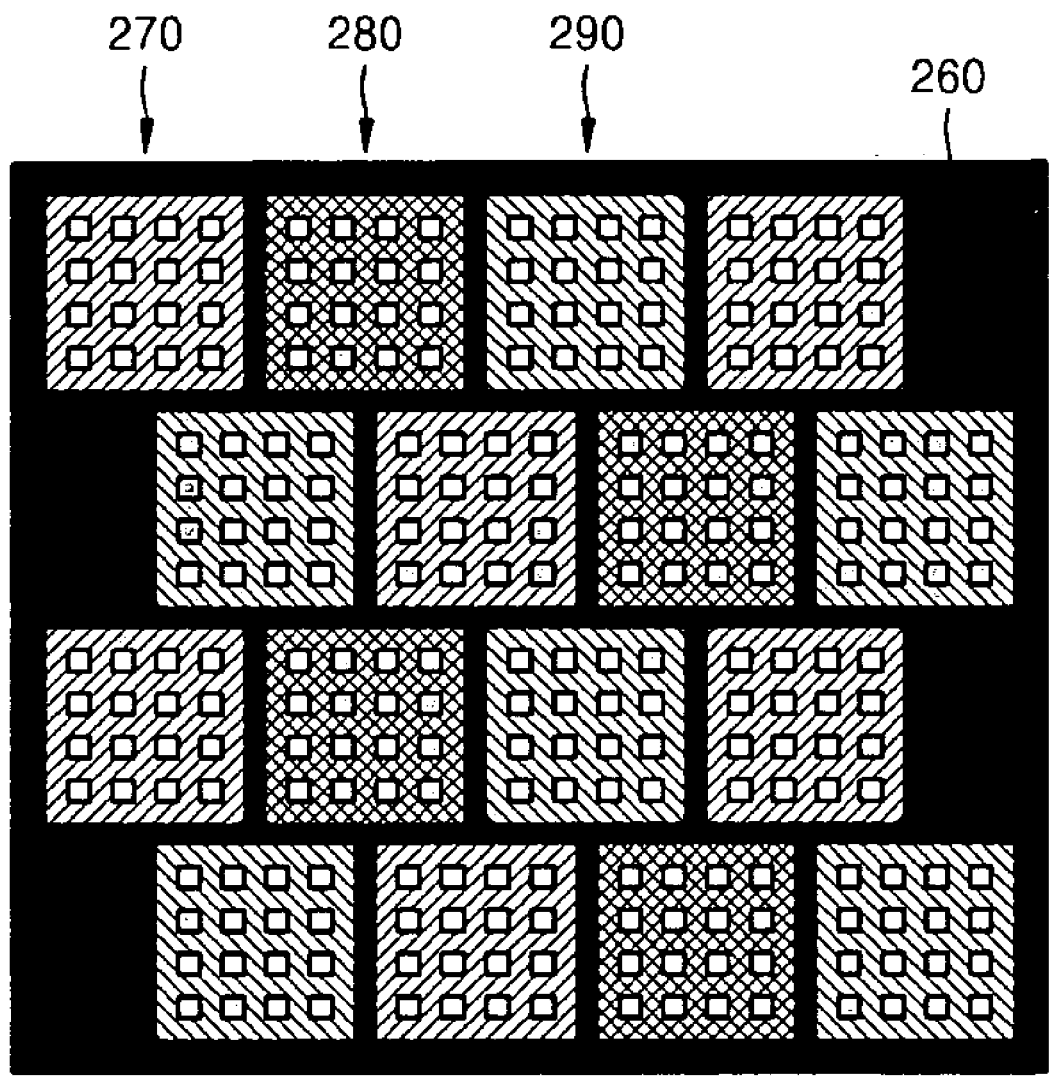

FIGS. 4A through 4C are plan views of the plurality of photonic crystal units 270, 280, and 290 of the transmissive color filter 200 of FIG. 3. FIG. 4A illustrates the plurality of the photonic crystal units 270, 280, and 290 forming striped patterns such that the red, green and blue photonic crystal units 270, 280 and 290 are arranged in straight lines, respectively. FIG. 4B illustrates the plurality of the photonic crystal units 270, 280, and 290 arranged such that different colors are adjacent to one another in a mosaic pattern. FIG. 4C illustrates the plurality of the photonic crystal units 270, 280, and 290 arranged in a delta pattern such that lines connecting the centers of the plurality of the red, green and blue photonic crystal units 270, 280, and 290 to one another form delta (Δ) shapes.

Figure 5:
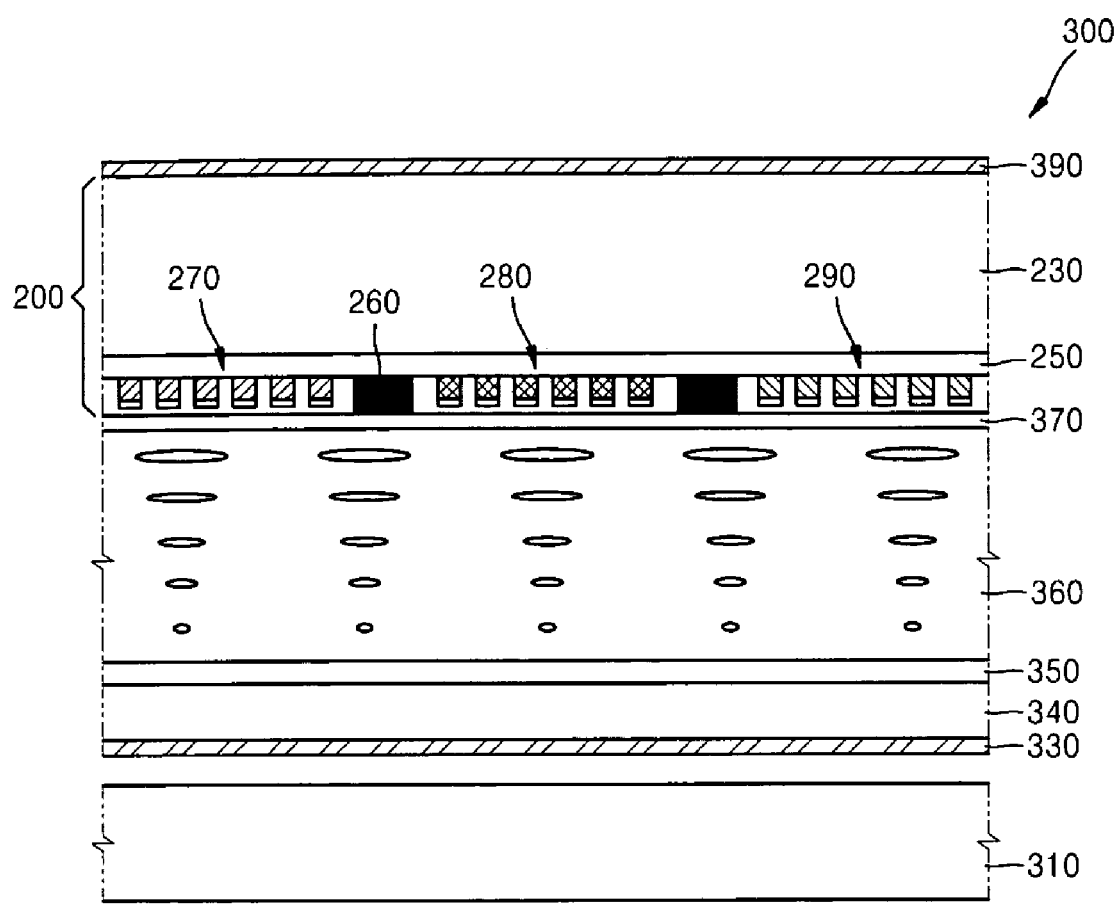
FIG. 5 is a cross-sectional view of a display apparatus according to example embodiments.

FIG. 5 is a cross-sectional view of a display apparatus 300 according to example embodiments. Referring to FIG. 5, the display apparatus 300 may include a backlight unit 310 providing light, a liquid crystal layer 360 of which the transmissivity with respect to incident light is electrically controlled, a transmissive color filter 200 that transmits light of a predetermined wavelength band corresponding to a photonic band gap among incident light from the backlight unit 310, and a thin film transistor (TFT)-array layer 350 that drives the liquid crystal layer 360 according to image information.

The transmissive color filter 200 may have substantially the same structure as the transmissive color filter 200 described with reference to FIG. 3. Thus, the description thereof will be omitted for purposes of brevity. The liquid crystal layer 360 may be disposed between a transparent substrate 340 and the transmissive color filter 200, and may be formed of various types of liquid crystals known to one of ordinary skill in the art. For example, the liquid crystal layer 360 may be formed of twisted nematic (TN) liquid crystals, in-plain switching (IPS) liquid crystals, multi-domain vertical alignment (MVA) liquid crystals, optical compensated bend (OCB) liquid crystals, etc.

The TFT-array layer 350 may be formed on a surface of the transparent substrate 340 facing the liquid crystal layer 360. Although the TFT-array layer 350 is not illustrated in detail, it should be understood that the TFT-array layer 350 may include a plurality of TFTs and a plurality of pixel electrodes corresponding to a plurality of pixels. A transparent electrode 370 may be formed on a surface of the transmissive color filter 200 as a common electrode. Polarization plates 330 and 390 may be formed on external surfaces of the transparent substrates 340 and 230, respectively. According to the type or driving mode of the liquid crystal layer 360, a half-wavelength plate or a quarter-wavelength plate may be further formed.

Figure 6:
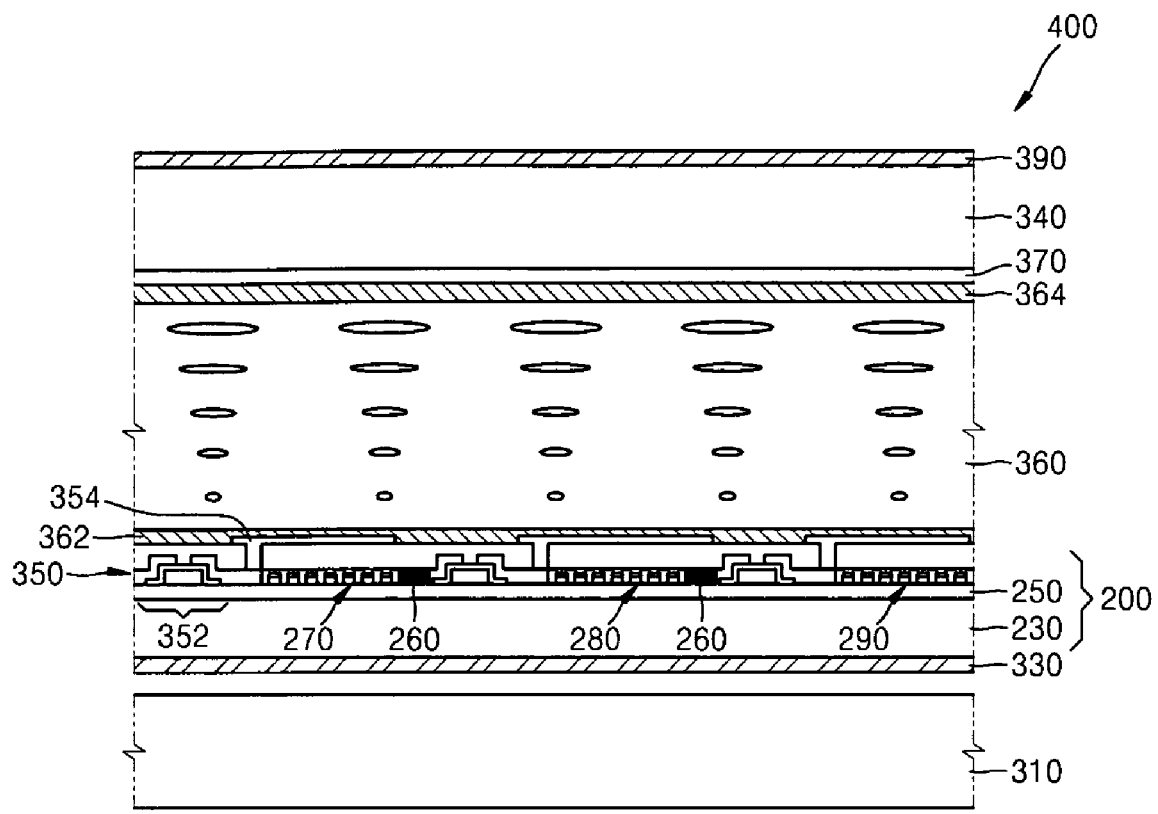
FIG. 6 is a cross-sectional view of another display apparatus according to example embodiments.

FIG. 6 is a cross-sectional view of another display apparatus 400 according to example embodiments. The display apparatus 400 differs from the display apparatus 300 of FIG. 5 in that TFTs 352 of the TFT-array layer 350 and the photonic crystal units 270, 280, and 290 of the transmissive color filter 200 are formed on one substrate, e.g., the transparent substrate 230. The TFT-array layer 350 may include TFTs 352 and a plurality of pixel electrodes 354. The TFTs 352 may be formed on the barrier layer 250 and adjacent to the photonic crystal units 270, 280, and 290, and the plurality of the pixel electrodes 354 may be formed on the photonic crystal units 270, 280, and 290. An alignment layer 362 may be formed over the plurality of the pixel electrodes 354. Furthermore, an alignment layer 364 is formed on the liquid crystal layer 360.

The display apparatus 400 may have a structure in which the photonic crystal units 270, 280, and 290 of the transmissive color filter 200 and the TFTs 352 are formed on one substrate, e.g., the transparent substrate 230. Accordingly, the transmissive color filter 200 and the TFT-array layer 350 may be formed in one process. The above-described structure of the display apparatus 400 may reduce manufacturing errors compared to a conventional liquid crystal display apparatus in which a color filter is formed on an upper substrate and a TFT array is formed on a lower substrate. For example, in the case of a conventional liquid crystal display apparatus where the color filter and the TFT array are manufactured separately and then coupled to each other, the lines thereof need to be aligned for each of the units of the pixels. As a result, alignment errors may occur. However, according to example embodiments, because the transmissive color filter 200 and the TFT-array layer 350 may be formed on one substrate, e.g., the transparent substrate 230, such errors may be reduced or prevented.

FIG. 7 is a perspective view of a transflective color filter 500 according to example embodiments. Referring to FIG. 7, the transflective color filter 500 may include a transparent substrate 530, a barrier layer 550 formed on the transparent substrate 530, and a photonic crystal unit 560 formed on the barrier layer 550. In FIG. 7, the photonic crystal unit 560 corresponding to one pixel area is illustrated for convenience of explanation. Thus, in practice, a plurality of the photonic crystal units 560 corresponding to, for example, red color light, green color light, and blue color light may be repeatedly arranged.

In the photonic crystal unit 560, a first material 562 having a relatively high refractive index and a second material 566 having a relatively low refractive index may be periodically arranged. The photonic crystal unit 560 may include a reflection area RA and a transmission area TA. In the reflection area RA, the first material 562 may be formed into island-shaped patterns, while in the transmission area TA, the first material 562 may be formed into a lattice pattern having holes therein. Thus, the periodic arrangements of the first material 562 and the second material 566 may be inverse images of each other in the reflection area RA and the transmission area TA. Accordingly, light having a predetermined wavelength among incident light may be reflected in the reflection area RA, and light having the predetermined wavelength among the incident light may be transmitted in the transmission area TA.

An optical cut-off layer 564 may be formed on the first material 562 to improve the cut-off characteristics of the photonic crystal unit 560. Also, the second material 566 may be formed as a supporting layer supporting the island-shaped patterns of the reflection area RA and the lattice pattern of the transmission area TA. As illustrated in FIG. 7, the second material 566 may fill the spaces between the island-shaped patterns and the holes in the lattice pattern by completely covering the first material 562. The first material 562, the second material 566, the barrier layer 550, and the optical cut-off layer 564 may be of the same as the first material 162, the second material 166, the barrier layer 150, and the optical cut-off layer 164 described with reference to FIG. 1. Thus, the descriptions thereof will be omitted for purposes of brevity.

Figure 8A:
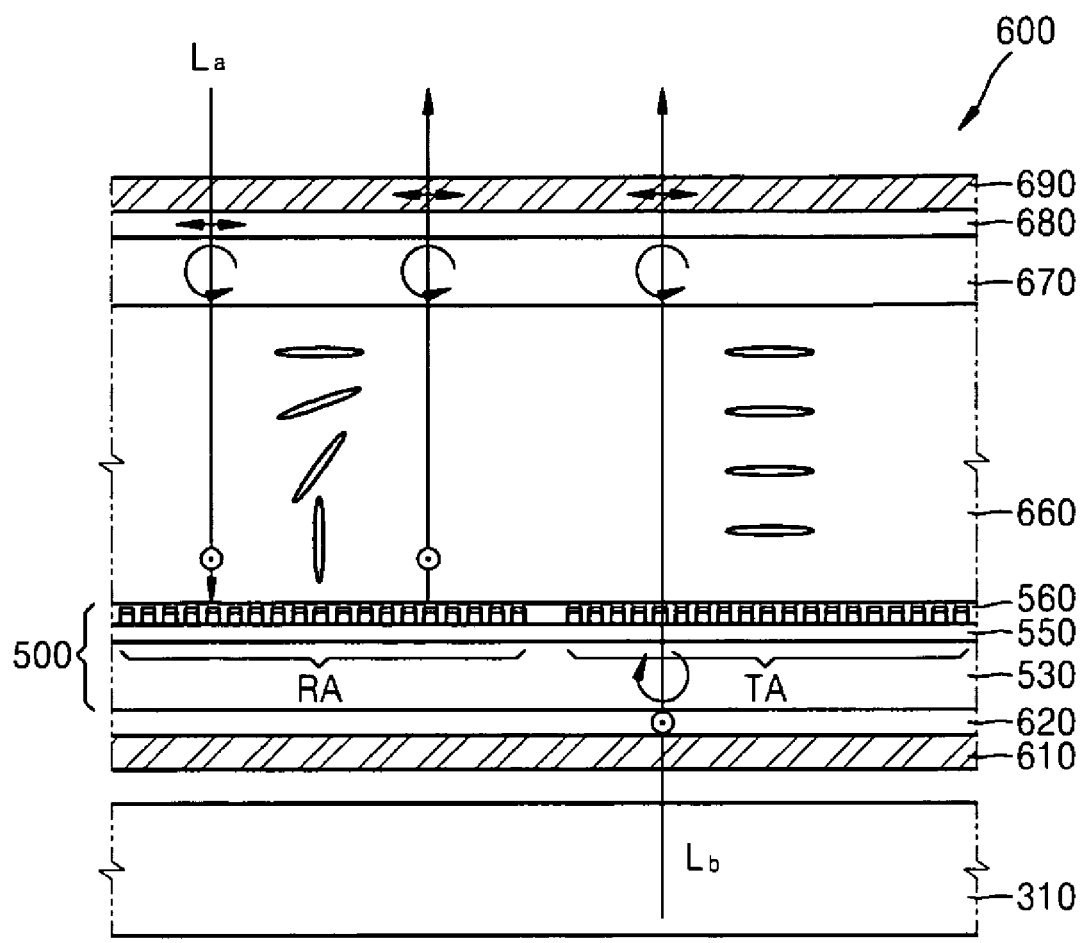
FIGS. 8A and 8B are cross-sectional views of a transflective display apparatus according to example embodiments, including optical paths corresponding to on and off states, respectively.
Figure 8B:
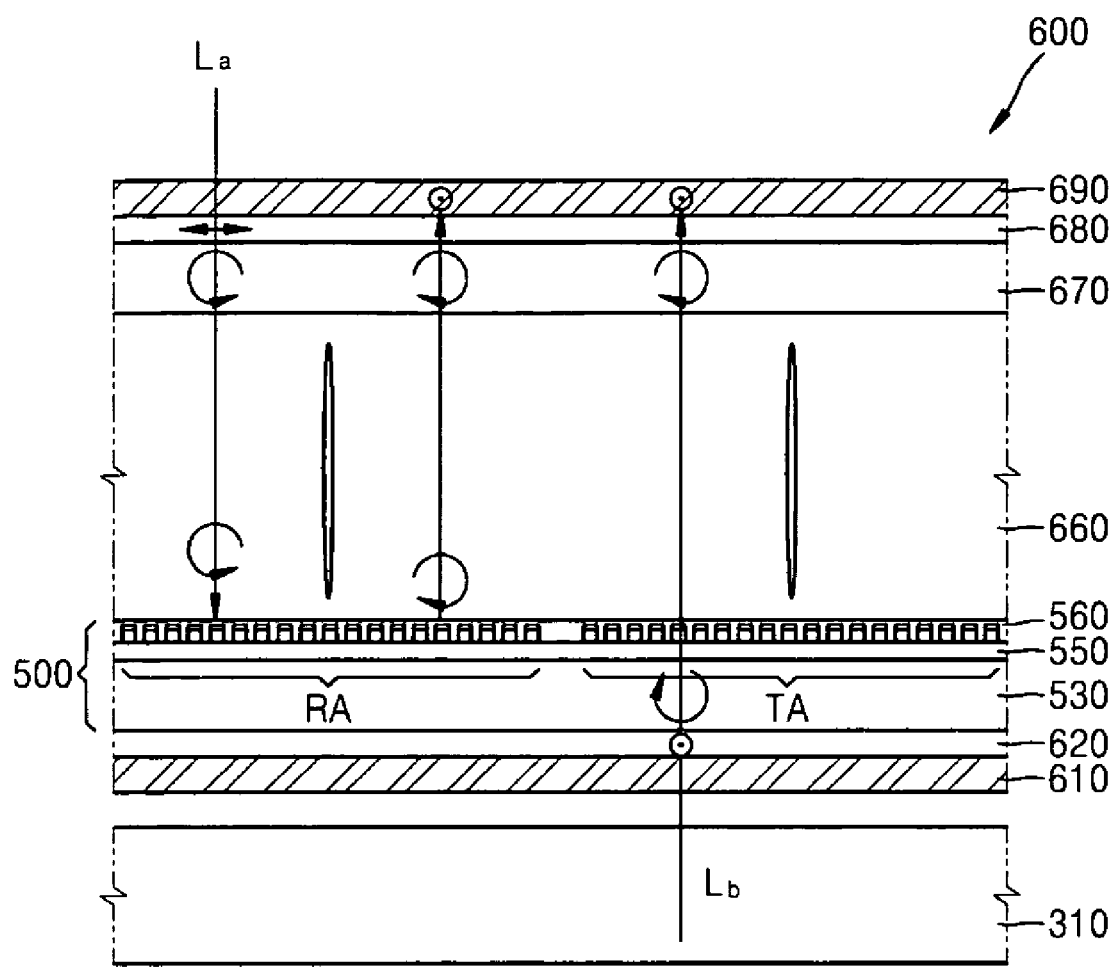

FIGS. 8A and 8B are cross-sectional views of a transflective display apparatus 600 according to example embodiments, including optical paths corresponding to on and off states, respectively. Referring to FIGS. 8A and 8B, the transflective display apparatus 600 may include a backlight unit 310 for providing light, a transflective color filter 500, and a liquid crystal layer 660. The transflective color filter 500 may be the same as the transflective color filter 500 described with reference to FIG. 7. Thus, a description thereof will be omitted for purposes of brevity.

The liquid crystal layer 660 may be formed between the transflective color filter 500 and a transparent substrate 670. The liquid crystal layer 660 may be formed of various types of liquid crystals known to one of ordinary skill in the art. The liquid crystal layer 660 has areas that respectively correspond to the reflection area RA and the transmission area TA, wherein the areas may have the same thicknesses but may vary in orientation. For example, the area of the liquid crystal layer 660 corresponding to the reflection area RA may be formed to have a phase difference of $\lambda/4$, while the area of the liquid crystal layer 660 corresponding to the transmission area TA may be formed to have a phase difference of $\lambda/2$.

However, in the alternative, the thickness of the area of the liquid crystal layer 660 corresponding to the reflection area RA may be half the thickness of the area corresponding to the transmission area TA, and the two areas may have the same orientation.

First and second quarter-wavelength plates 620 and 680 may be disposed on outer surfaces of transparent substrates 530 and 670, respectively. First and second polarization plates 610 and 690 may be formed on outer surfaces of the first and second quarter-wavelength plates 620 and 680, respectively. The first and second polarization plates 610 and 690 may have polarization axes that are perpendicular to each other. The first polarization transmitting the first polarization plate 610 is indicated with the symbol ⊙, and the second polarization transmitting the second polarization plate 680 is indicated with the symbol ↔. Some portions of the transflective color filter 500 may be modified or removed according to the first and second quarter-wavelength plates 620 and 680, the first and second polarization plates 610 and 690, and the type, thickness, and orientation of the above-described liquid crystal layer 660. In addition, the transflective color filter 500 may further include TFTs that drive the liquid crystal layer 660 and that respectively correspond to the pixels, pixel electrodes, common electrodes, etc. The transflective display apparatus 600 may form an image using ambient light $L_a$ and/or backlight $L_b$, as will be described below with reference to the description of optical paths.

FIG. 8A illustrates initial orientation of the liquid crystal layer 660 where an electrical field is not applied. The backlight $L_b$ from the backlight unit 310 that is incident to the first polarization plate 610 transmits through the first polarization plate 610 and exits as light of a first polarization (⊙) and then transmits through the first quarter wavelength plate 620 and exits with left-handed circular polarization. Next, the backlight $L_b$ transmits through the transmission area TA of the transflective color filter 500 and exits with a corresponding color of the transflective color filter 500. Then the backlight $L_b$ transmits through the liquid crystal layer 660 and exits as right-handed circular polarization light with the phase difference of $\lambda/2$, and then transmits through the second quarter-wavelength plate 680 and exits with a second polarization (↔), thereby transmitting through the second polarization plate 690. The ambient light $L_a$ incident on a front surface of the transflective display apparatus 600 transmits through the second polarization plate 690 and exits as light of the second polarization (↔), and then transmits through the second quarter-wavelength plate 680 and exits as left-handed circular polarization light. Next, the ambient light $L_a$ transmits through the liquid crystal layer 660 and exits with the first polarization (⊙) with the phase difference of $\lambda/4$. Next, light of the corresponding color of the transflective color filter 500 is reflected in the reflection area RA of the transflective color filter 500. Then the reflected ambient light $L_a$ transmits through the liquid crystal layer 660 again and exits as right-handed circular polarization light, and then transmits through the second quarter-wavelength plate 680 and exits with the second polarization (↔), thereby transmitting through the second polarization plate 690.

FIG. 8B illustrates the liquid crystal layer 660 orientated in a direction of an electric field applied to the liquid crystal layer 660. The backlight $L_b$ from the backlight unit 310 that is incident to the first polarization plate 610 transmits through the first polarization plate 610 and exits as light of a first polarization (⊙), and transmits through the first quarter-wavelength plate 620 and exits as left-handed circular polarization light. Next, the backlight $L_b$ transmits through the transmission area TA of the transflective color filter 500 and exits as light of a corresponding color of the transflective color filter 500. While transmitting through the liquid crystal layer 660, the polarization of the backlight $L_b$ does not change, and after transmitting through the second quarter-wavelength plate 680, the light has the first polarization (⊙) and thus does not transmit through the second polarization plate 690. The ambient light $L_a$ incident on the front surface of the transflective display apparatus 600 transmits through the second polarization plate 690 and exits with the second polarization (↔), and transmits through the second quarter-wavelength plate 680 and exits as left-handed circular polarization light. While transmitting through the liquid crystal layer 660, the polarization of the ambient light $L_a$ does not change. After being reflected in the reflection area RA of the transflective color filter 500, the ambient light $L_a$ has a corresponding color of the transflective color filter 500. The reflected ambient light $L_a$ maintains left-handed circular polarization while transmitting through the liquid crystal layer 660, and exits with the first polarization (⊙) by the second quarter-wavelength plate 680 and thus does not transmit through the second polarization plate 690.

Although the above on/off states are described with respect to one color pixel, it should be understood that the transflective display apparatus 600 may include a plurality of color pixels by which an image is formed. The transflective display apparatus 600 may form an image using the ambient light $L_a$ and the backlight $L_b$ and, thus, may have better visibility and lower power consumption.

As described above, the transmission wavelength bands of a photonic crystal optical filter may be determined with relative ease according to the shape and periods of the higher refractive patterns, and may have improved filtering capability.

A transmissive color filter and a transflective color filter according to example embodiments may have improved color characteristics, and R, G, and B colors may be realized by performing a nano-imprinting process once, unlike a conventional photolithography process which may need to be repeated three times to realize R, G, and B colors, thereby reducing the number of manufacturing processes. Also, the photonic crystal color filter and a TFT array may be formed on one substrate of a display apparatus according to example embodiments, and thus manufacturing operations or process errors as well as costs may be reduced. Also, a transflective display apparatus using the transflective color filter may have improved visibility and lower power consumption.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A photonic crystal optical filter comprising:
    a transparent substrate;
    a barrier layer on the transparent substrate, the barrier layer entirely covering a surface of the transparent substrate; and
    a photonic crystal layer comprising a first material and a second material which are periodically arranged in an array of two dimensions, the two dimensions corresponding to a plane of the barrier layer, and an optical cut-off layer on the first material, the first material being formed into a lattice pattern having holes therein, the second material being formed to entirely cover the first material and the optical cut-off layer and to entirely fill the holes of the lattice pattern of the first material, and a refractive index of the first material being higher than a refractive index of the second material, the photonic crystal layer configured to transmit light having a wavelength corresponding to a photonic band gap.

2. The photonic crystal optical filter of claim 1, wherein a difference between real parts of the refractive indices of the first material and the second material is about two or greater.

3. The photonic crystal optical filter of claim 1, wherein imaginary parts of the refractive indices of the first material and the second material are about 0.1 or smaller in a visible light wavelength band.

4. The photonic crystal optical filter of claim 1, wherein the first material is one selected from the group consisting of mono-crystal Si, Poly Si, AlSb, AlAs, AlGaAs, AlGaInP, BP, $ZnGeP_2$, and mixtures thereof.

5. The photonic crystal optical filter of claim 1, wherein the second material is one selected from the group consisting of Air, PC, PS, PMMA, $Si_3N_4$, $SiO_2$, and mixtures thereof.

6. The photonic crystal optical filter of claim 1, wherein the optical cut-off layer is a silicon oxide layer ($SiO_2$) or a silicon nitride layer ($Si_3N_4$).

7. The photonic crystal optical filter of claim 1, wherein the second material is formed as a supporting layer that supports the lattice pattern.

8. The photonic crystal optical filter of claim 7, wherein the barrier layer is formed of a same material as the second material.

* * * * *